(12) United States Patent
Zhou et al.

(10) Patent No.: US 8,059,806 B2
(45) Date of Patent: Nov. 15, 2011

(54) METHOD AND SYSTEM FOR MANAGING A COMMUNICATION SESSION

(75) Inventors: James Kefeng Zhou, Beijing (CN); Leonard C. Hause, Austin, TX (US)

(73) Assignee: Motorola Mobility, Inc., Libertyville, IL (US)

( * ) Notice: Subject to any disclaimer, the term of this patent is extended or adjusted under 35 U.S.C. 154(b) by 1220 days.

(21) Appl. No.: 11/612,290

(22) Filed: Dec. 18, 2006

(65) Prior Publication Data

US 2008/0144807 A1   Jun. 19, 2008

(51) Int. Cl.
*H04M 3/42* (2006.01)

(52) U.S. Cl. ......... 379/202.01; 379/205.01; 379/388.01; 379/388.02; 379/388.03; 379/390.01; 379/390.03

(58) Field of Classification Search ............. 379/202.01, 379/205.01, 206.04, 388.01, 388.02, 388.03, 379/390.01, 390.03; 370/260, 263
See application file for complete search history.

(56) References Cited

U.S. PATENT DOCUMENTS

| | | | |
|---|---|---|---|
| 4,914,704 A | 4/1990 | Cole et al. | |
| 6,609,198 B1 | 8/2003 | Wood et al. | |
| 6,895,098 B2 | 5/2005 | Allegro et al. | |
| 6,963,841 B2 | 11/2005 | Handal et al. | |
| 2002/0188571 A1 | 12/2002 | Pilgrim | |
| 2005/0213739 A1 | 9/2005 | Rodman et al. | |
| 2005/0237952 A1 | 10/2005 | Punj et al. | |
| 2005/0286443 A1 | 12/2005 | McMillen et al. | |
| 2007/0200919 A1 * | 8/2007 | D'Amora et al. | 348/14.08 |

* cited by examiner

*Primary Examiner* — Quynh Nguyen
(74) *Attorney, Agent, or Firm* — Stephen H. Shaw

(57) ABSTRACT

A method and system for managing a communication session is provided. The communication session is associated with multiple communication devices. The method includes learning (304) a set of derived acoustic features of an audio communication signal that is associated substantially only with one user of a communication device. The method also includes receiving (306) a communication session signal. The communication session signal is an audio signal that includes a combination of audio communication signals. Each audio communication signal of the audio communication signals is associated with a user of a communication device of the multiple communication devices. The method includes modifying (308) the communication session signal based on the set of derived acoustic features.

13 Claims, 3 Drawing Sheets

METHOD AND SYSTEM FOR MANAGING A COMMUNICATION SESSION

FIELD OF THE INVENTION

The present invention generally relates to the field of audio communication, and more particularly, to a method and system for managing a communication session.

BACKGROUND OF THE INVENTION

Today, the need for establishing audio-conferencing sessions between one or more users present at different geographical locations is increasing, since the geographical area in which the companies conduct business is expanding continuously. This has resulted in the extensive use of audio conferencing devices in these audio-conferencing sessions. Examples of such audio-conferencing devices include, but are not limited to, a telephone, a computer, a Personal Digital Assistant (PDA), and a laptop.

During an audio-conferencing session, each user of the audio-conferencing device involved in the audio-conferencing session may communicate with multiple users of other audio-conferencing devices. These multiple users can be present at different geographical locations. For example, some users involved in the audio-conferencing session may be present at Seattle, while some users may be present at Boston. These users may be connected through a network. Examples of the network include The Internet, a wired network, and a wireless network. In one scenario, multiple users in an organization can communicate in an audio-conferencing session through an enterprise network.

Sometimes, during an audio-conferencing session, some users may speak with a volume level that is undesirable to some other users involved in the audio-conferencing session. As a result, a particular user may find it difficult to listen to other users involved in the audio-conferencing session. Moreover, when this speaker speaks at volume beyond a certain level, the user may not be able to completely understand and listen clearly and what the speaker is saying in the audio-conferencing session. This degrades the overall quality of communication in the audio-conferencing session. As a result, the overall objective of the audio-conferencing session may not be achieved.

BRIEF DESCRIPTION OF DRAWINGS

The accompanying figures, where like reference numerals refer to identical or functionally similar elements throughout the separate views, and which, together with the detailed description below, are incorporated in and form part of the specification, serve to further illustrate various embodiments and explain various principles and advantages, all in accordance with the present invention.

Figure 1:
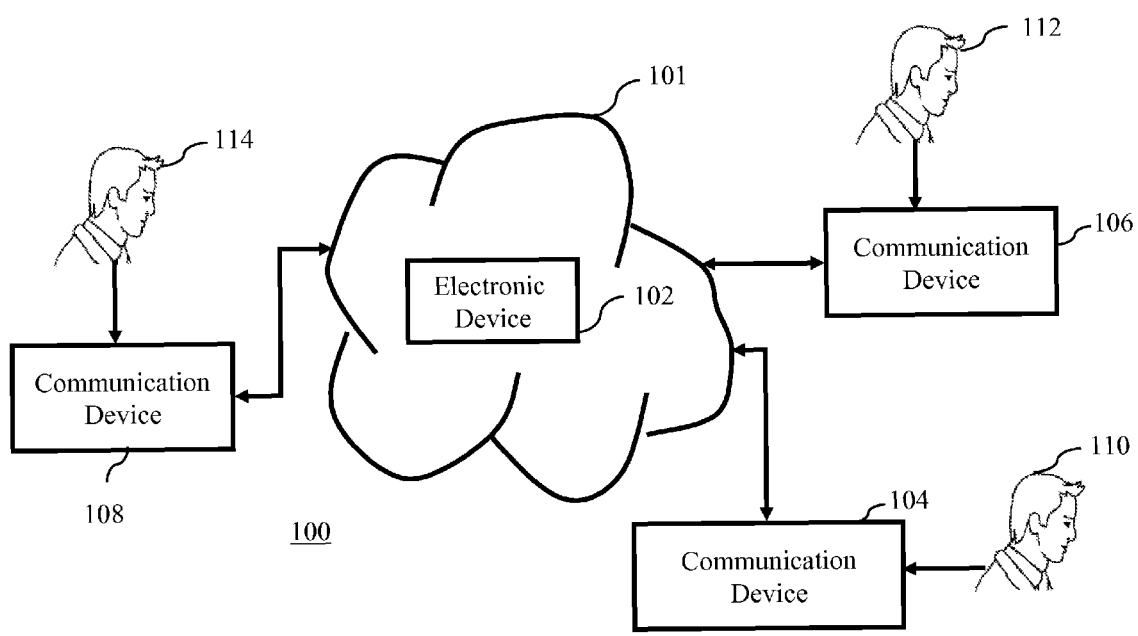
FIG. 1 illustrates an exemplary communication network, where various embodiments of the present invention can be practiced.

Skilled artisans will appreciate that elements in the figures are illustrated for simplicity and clarity and have not necessarily been drawn to scale. For example, the dimensions of some of the elements in the figures may be exaggerated, relative to other elements, to help in improving an understanding of the embodiments of the present invention.

DETAILED DESCRIPTION

Before describing in detail the particular method and system for managing a communication session, in accordance with various embodiments of the present invention, it should be observed that the present invention utilizes a combination of method steps and apparatus components related to the method and system for managing the communication session. Accordingly, the apparatus components and method steps have been represented, where appropriate, by conventional symbols in the drawings, showing only those specific details that are pertinent for an understanding of the present invention, so as not to obscure the disclosure with details that will be readily apparent to those with ordinary skill in the art, having the benefit of the description herein.

In this document, the terms 'comprises,' 'comprising,' 'includes,' or any other variation thereof, are intended to cover a non-exclusive inclusion, such that a process, article, system or apparatus that comprises a list of elements does not include only those elements but may include other elements not expressly listed or inherent to such a process, article, or apparatus. An element proceeded by 'comprises . . . a' does not, without more constraints, preclude the existence of additional identical elements in the process, article, system, or apparatus that comprises the element. The terms "includes" and/or "having", as used herein, are defined as comprising.

For various embodiments described below, it is desirable to identify a speaker (that is, a talker) within a communications session signal that may comprise the audio of several speakers mixed (i.e., added) together. Speaker identity is correlated with the physiological and behavioral characteristics of the speaker. These physiological and behavioral characteristics result in an audio signal that has stationary stochastic properties that may be characterized by what are known as acoustic features. There are acoustic features related to vocal tract characteristics (spectral envelope features typically represented by a set of Cepstral Coefficients derived from linear prediction coefficients) and acoustic features related to learned behavioral patterns (supra-segmental acoustic features such as voice pitch, intensity, and segment duration). These acoustic features collectively have been found to differ sufficiently between speakers that recognition of a speaker's identity may be determined from them. The process is called speaker recognition. Each speaker recognition system has two phases: learning and identification. During the learning phase, the speaker's voice is processed and typically a number of these acoustic features are derived to form a template. In the identification phase the audio signal is matched to the templates, and when the match is sufficiently close, a speaker is identified. The template can also be used to determine which acoustic features of a combined signal to change in order to modify substantially only that speaker's signal within the combined signal. Furthermore, the template can be used to ascertain aspects of the speaker's signal with reference to the remaining portion of a combined signal. One aspect is relative audio volume. Furthermore, if templates are available for a plurality of speakers whose communication signals are combined, then aspects of each speaker's signal can be determined. This works particularly well when the number of speakers is small such as two or three.

It will be appreciated that the template can be used in another way—that is to modify those features of a combined audio signal that includes an audio signal of the speaker for whom the template was formed. This is done by using the template to select the features and apply changes to them to accomplish modifications such as apparent signal strength of the speakers signal with reference to the other audio signals in the combined signal. Another example of something that could be modified is a selected frequency range within the signal (i.e., bass or treble emphasis or deemphasis).

In an embodiment, a method for managing a communication session is provided. The communication session is associated with a plurality of communication devices. The method includes learning a set of acoustic features of an audio communication signal that is associated substantially only with one user of a communication device. These are called derived acoustic features in this document. The method also includes receiving a communication session signal. This communication session signal is an audio signal that includes a combination of audio communication signals. Each audio communication signal of the audio communication signals is associated with a user of a communication device of the plurality of communication devices. Further, the method includes modifying the communication session signal based on the set of derived acoustic features when the communication session signal includes an audio communication signal associated with the user of the communication device.

In another embodiment, a first communication device for managing a communication session is provided. The first communication device includes a transceiver that is configured to receive a communication session signal. The communication session signal is associated with one or more other communication devices. This communication session signal is an audio signal that includes a combination of audio communication signals. Each audio communication signal of the audio communication signals is associated with a user of a communication device of the plurality of communication devices. The first communication device also includes a processor that is operatively coupled with the transceiver. The processor is configured to learn a set of derived acoustic features of an audio communication signal that is associated substantially only with one user of a second communication device. The processor is also configured to modify the communication session signal based on the set of derived acoustic features when the communication session signal includes an audio communication signal that is associated with the user of the second communication device.

FIG. 1 illustrates an exemplary communication system 100, where various embodiments of the present invention can be practiced. The communication system 100 can be a wide area network, a wireless network, a Bluetooth network, a WiMax network, a wired network, or the like and combinations thereof. The communication system 100 includes a communication network 101 that may include an electronic device 102. An example of the electronic device 102 can be a centralized server that is used in an audio-conferencing session. The communication system 100 also includes communication devices 104, 106 and 108. Examples of the communication devices 104, 106 and 108 include, but are not limited to, a wired or wireless, or remote telephone, a computer, a conference speakerphone, and a video teleconferencing device. Although the communication system 100 is shown to include the communication devices 104, 106, and 108 in FIG. 1, it will be apparent to a person ordinarily skilled in the art that the communication system 100 can include a larger or smaller number of communication devices, of which some may be engaged in a conference call, or a communication session.

In some embodiments, the communication devices 104, 106 and 108 may communicate with each other through the electronic device 102 to set up a communication session. The communication devices 104, 106, and 108 can be accessed by users 110, 112 and 114 respectively. Thereby, the users 110, 112 and 114 can communicate with each other by using the communication devices 104, 106 and 108. The users 110, 112 and 114 can be present at different geographical locations that are governed by different communication networks. For example, the user 110 is present at Seattle and is connected with the electronic device 102 through a wireless network and the users 112 and 114 are present at Boston and are connected with the electronic device 102 through a local area network. One or more users could also be co-located with any one of the communication devices 104, 106 and 108, for example, when the communication device 104, 106 or 108 is a speakerphone.

The electronic device 102 can receive audio communication signals from the communication devices 104, 106 and 108. The electronic device 102 can set up a conference call between the communication devices 104, 106 and 108, during which the electronic device 102 transmits communication session signals to each of the communication devices 104, 106 and 108, for which each communication session signal includes audio communication signals from those communication devices of the communication devices 104, 106 and 108 other than the communication device 104, 106 and 108 to which the communication session signal is being sent. In some embodiments, during a conference call, the electronic device 102 can also modify the audio communication signals to enhance the quality of the communication session. In these embodiments, the electronic device 102 can receive preferences from one or more of the users 110, 112 and 114 through communication devices 104, 106 and 108 respectively to enhance the quality of the communication session. After receiving these preferences, the electronic device 102 can modify the communication session signals based on these user preferences. For example, when the strength of the audio communication signal received by the communication device 104 relative to an audio communication signal being received simultaneously from communication device 108 from the communication device 106 is more than a limit desired by the user 110, the user 110 can provide his/her preferences to the electronic device 102 through the communication device 104 to reduce the strength of the audio communication signal from the communication device 106 received at the communication device 104.

In some embodiments, the communication devices 104, 106 and 108 can communicate with each other through the communication network 101 to set up a communication session. In this embodiment, one or more of the communication devices 104, 106 and 108 can modify the audio communication signals received at the communication device to enhance the quality of the communication session for the user of the communication device. In certain embodiments, the communication devices 104, 106 and 108 modify the communication session signals based on user preferences associated with these devices. For example, when the strength of the audio communication signal received by the communication device 104 from the communication device 106 relative to an audio communication signal being received simultaneously from the communication device 108 is more than a limit desired by the user 110, the user 110 can provide his/her preferences to the communication device 104 to reduce the strength of the audio communication signal from the communication device 106 received at the communication device 104.

Figure 2:
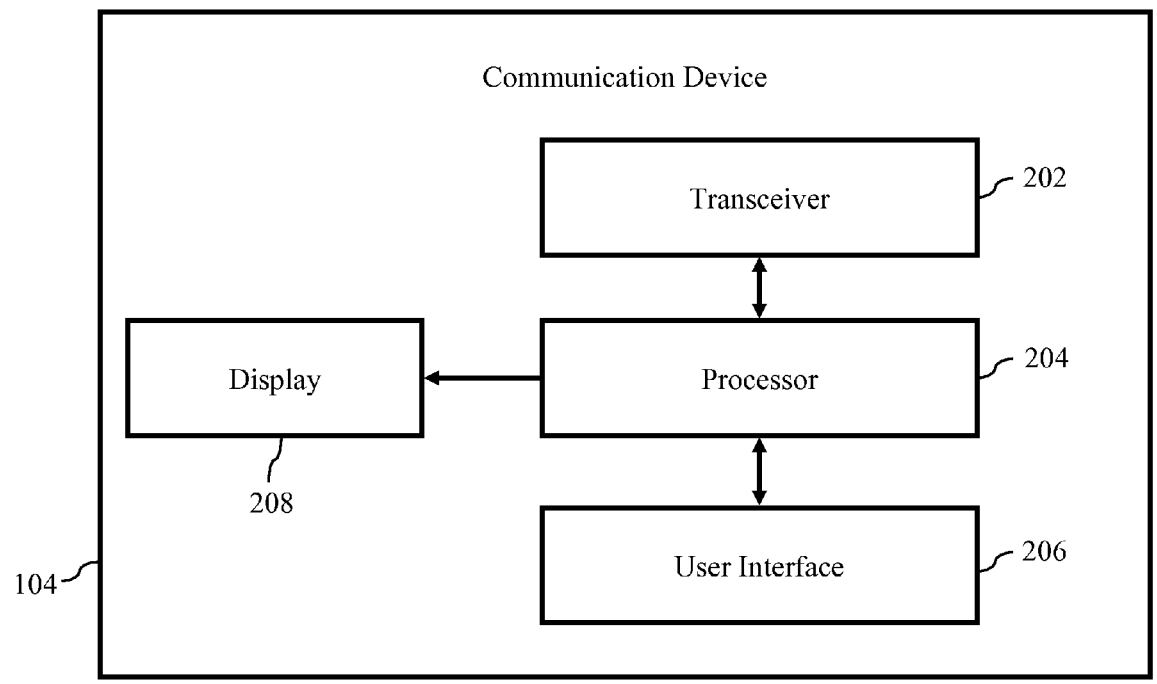
FIG. 2 is a block diagram of a communication device, in accordance with an embodiment of the present invention.

FIG. 2 illustrates a block diagram of the communication device 104, herein-after referred to as the first communication device 104, in accordance with certain embodiments of the present invention. The first communication device 104 is present in the communication system 100. In the communication system 100, the first communication device 104 and the communication devices 106 and 108 can directly set up a communication session. The first communication device 104 can manage the communication session associated with multiple communication devices by modifying the audio communication signals received from the communication devices 106 and 108, as shown in FIG. 1. The first communication device 104 includes a transceiver 202 and a processor 204. The transceiver 202 is configured to receive a communication session signal. The communication session signal is an audio signal that includes a combination of audio communication signals. Each audio communication signal of the audio communication signals is associated with a user of a communication device of the multiple communication devices. The transceiver 202 can also transmit a communication signal that includes audio generated by the user 110 of the first communication device 104. For example, the transceiver 202 may receive a communication session signal, wherein the communication session signal is a combination of audio communication signals associated with the users of the communication devices 106 and 108. It will be appreciated that in some cases, the "combination" of audio communication signals that form the communication session signal may be only one signal or may be "no" signal (for example, when there are a plurality of audio communication signals but none include any significant energy; i.e., no one is talking).

The processor 204 is operatively coupled with the transceiver 202. The processor 204 can be programmed to learn a set of derived acoustic features of an audio communication signal that is associated substantially only with one user of a second communication device. For example, the processor 204 can learn the set of derived acoustic features of an audio communication signal of the user 112 of communication device 106, which is also referred to hereafter as the second communication device 106. Examples of the derived acoustic features of an audio communication signal are vocal tract characteristics (spectral envelope features typically represented by a set of Cepstral Coefficients derived from linear prediction coefficients) and acoustic features related to learned behavioral patterns (supra-segmental acoustic features such as voice pitch, intensity, and segment duration), from which a template for the user can be formed, and an average power, energy, or signal level of the audio communication signal associated with the user 112 of the second communication device 106 may be determined. In an embodiment, the derived audio features include a signal level of the audio communication signal that is associated with the user 112 of the second communication device 106. The processor 204 may modify the communication session signal based on the set of derived acoustic features, by using the template, when the processor 204 identifies that the audio communication signal associated with the user 112 of the second communication device 106 should be altered. The processor 204 may determine the need for alteration based on a pre-defined criterion or user preferences. For example, the processor 204 may modify the communication session signal by increasing the strength of the audio communication signal associated with the user 112 of the second communication device 106, when the strength of the audio communication signal is lower than a pre-defined limit of the criterion.

In some embodiments, the processor 204 can modify the communication session signal based on the user preferences of the user 110 associated with the first communication device 104 to enhance the quality of the communication session. For example, the user 110 can enter a signal strength value as a preference into the first communication device 104. When the strength of the audio communication signal associated with user 112, received by the first communication device 104 from the second communication device 106, is more than the value desired by the user 110, the processor 204 may reduce the strength of the audio communication signal received at the first communication device 104, by using the template.

In some embodiments, the processor 204 can process the audio communication signal that is associated with the user 112 of the second communication device 106, when a communication session signal includes substantially only the audio communication signal that is associated with the user 112 of the second communication device 106. The term 'substantially only' means that the audio communication signal may include interfering audio other than that of the user, such as line noise or crosstalk, or some audio from another user such as might occur from a whispered conversation carried on away from a microphone of another communication device, wherein the interfering audio, is for example on the order of nine dBm below that of the user. The processed audio communication signal can be used to derive acoustic features of the audio communication signal. These derived acoustic features of the audio communication signal can be used to form a template. The processor 204 can identify the audio communication signal that is associated with the second communication device 106 from the audio communication signals that have been combined in a communication session signal, and modify the communication session signal by changing portions thereof associated with the audio communication signal associated with the user 112 of the second communication device 106, using the template. The processor 204 identifies the audio communication signal that is associated with the second communication device 106 by matching the acoustic features of the communication session signal with the template for the audio communication signal that is associated with the second communication device 106. For example, the processor 204 may process the audio communication signal associated with the user 112 of the second communication device 106 and derive acoustic features of the audio signal to form a template for the audio communication signal of user 112 of the second communication device 106. Before or during the communication session, the processor 204 may receive preferences from the user 110 to modify the audio communication signal of the user 112 of the second communication device 106. In some embodiments, the processor 204 then identifies the existence of the audio communication signal of the user 112 of the second communication device 106 within the communication session signal by matching acoustic features of the communication session signal with the template for the audio communication signal associated with the user 112 of the second communication device 106. When a sufficient match occurs between acoustic features of the communication session signal and the template (indicating that the communication session signal actually includes an audio communication signal of the user 112), the processor 204 then modifies the communication session signal based on the user preferences, using the template to determined acoustic features to be modified. In some embodiments, the identification of the existence of the audio communication signal of the user 112 of the second communication device 106 within the communication session signal may not be performed, or may not be performed for each instance in which the communication session signal is being modified in a new manner. In a typical example, the processor 204 modifies the acoustic features of the communication session signal to reduce the apparent signal strength of the portion of the communication session signal that represents the audio communication signal of the user 112, in response to a setting of the first communication device 104 entered by user 110.

In some embodiments, the processor 204 further identifies the strength of each audio communication signal of the communication session signal. For example, the processor 204 may identify strength of the audio communication signals associated with the users of the communication devices 106 and 108. In some embodiments, the first communication device 104 includes a user interface 206. The user interface 206 can receive preferences from the user 110 associated with the first communication device 104. In an embodiment, the user interface 206 is used for setting an audio volume of the audio communication signal that is associated substantially with the user 112 of the second communication device 106. In another embodiment, the first communication device 104 includes a display 208. The display 208 can represent characteristics of each audio communication signal of the audio communication signals associated with communication devices 106 and 108. The display 208 may allow presentation of signal characteristics and may be further be an interactive touch display, allowing entry of the user preferences such as volume or tone, and may present controls and characteristics in the form of an equalization panel.

Figure 3:
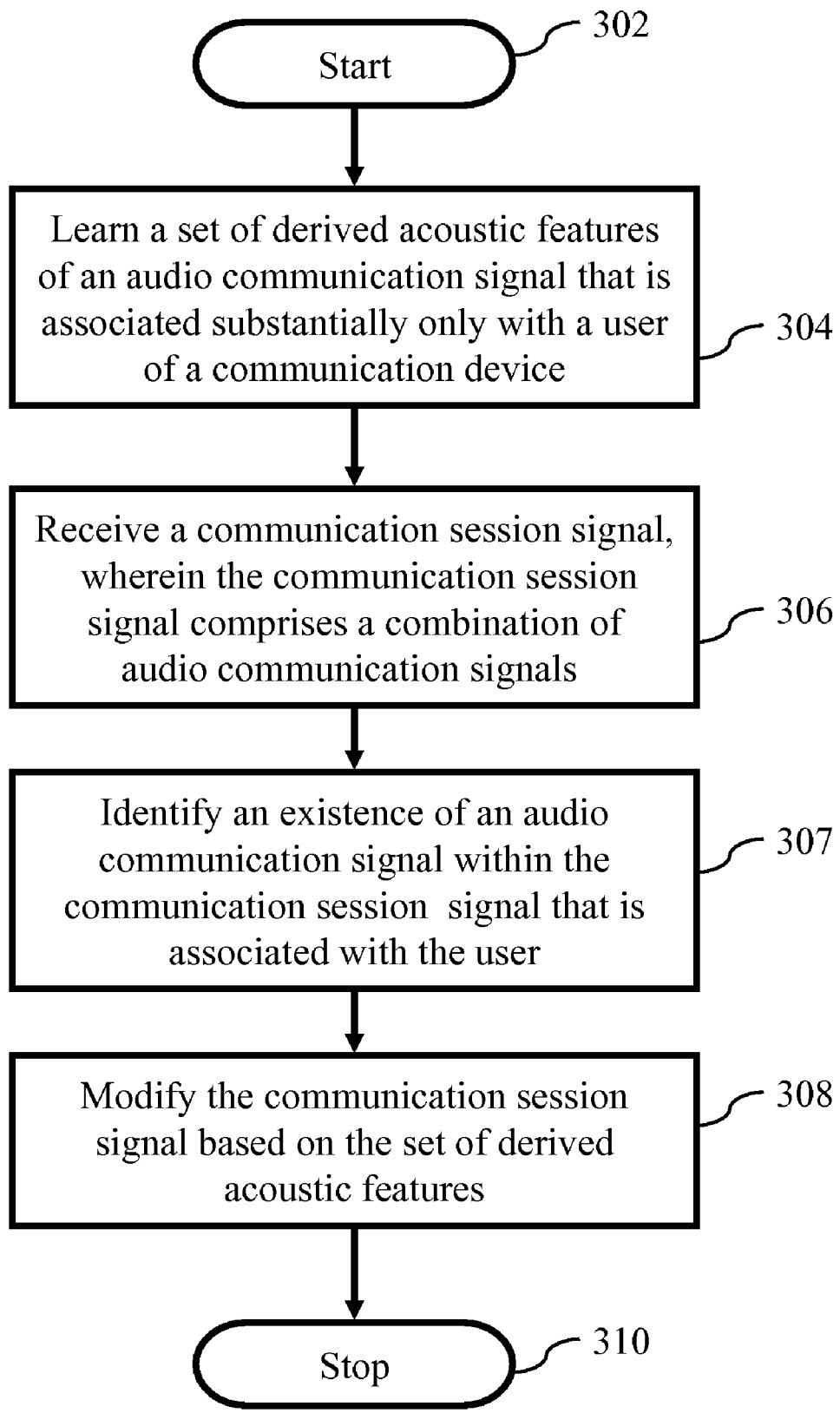
FIG. 3 is a flow diagram illustrating a method for managing a communication session, in accordance with an embodiment of the present invention.

FIG. 3 is a flow diagram illustrating a method for managing a communication session, in accordance with an embodiment of the present invention. In order to describe the method, reference will be made to FIG. 1, although it is understood that the method can be implemented in any suitable embodiment of the present invention.

At step 302, the method for managing a communication session is initiated. The communication session is associated with multiple communication devices. In the communication session, the multiple communication devices, for example, the communication devices 104, 106 and 108, can communicate with each other through a network. Examples of the network include, but are not limited to, a wireless network, a local area network, a Bluetooth network, a WiMax network, and a wired network. At step 304, a set of derived acoustic features of an audio communication signal that is associated with the user 112 of the second communication device 106 is learned by the processor 204 of the first communication device 104 using an audio communication signal that has been established as being one generated only by the user 112 of the second communication device 106 Note that this may be done using an audio communication signal generated by the user 112 of the second communication device 106 while using a communication device other than the second communication device 106. Examples of derived acoustic features of an audio communication signal are vocal tract characteristics (spectral envelope features typically represented by a set of Cepstral Coefficients derived from linear prediction coefficients) and acoustic features related to learned behavioral patterns (supra-segmental acoustic features such as voice pitch, intensity, and segment duration). At step 306, a communication session signal is received by the transceiver 202 of the first communication device 104. The communication session signal is an audio signal that includes a combination of audio communication signals. Each audio communication signal of the audio communication signals is associated with a user of a communication device of the multiple communication devices.

In some embodiments, an audio communication signal of the audio communication signals is associated with a second communication device of the multiple communication devices. For example, the first communication device 104 receives a communication session signal, where the communication session signal is combination of audio communication signals associated with the users of the communication devices 106 and 108, and, for the purposes of this description, the communication device 106 is a second communication device.

At step 307, an existence of the audio communication signal associated with the user 112 of the second communication device 106 is established, by using the template formed from the derived set of acoustic features. In some embodiments, this step is repeated often, so as to determine when modifications according to step 308 should be terminated. For example, it may be desirable to repeat this step at least once several times a second, for example 5 times per second. In some embodiments, this step may be skipped, such as when there is an independent source of knowledge about when the communication session signal includes an audio signal associated with the user 112. One example of this would be where the user 110 of the first communication device 104, upon hearing a communication session signal, determines which other user's audio signal needs adjustment and makes a input to the first communication device 104 that effectively selects that other user's template (for example, the user 112 of the second communication device 106 to be used modify the communication session signal, and enters a modification command (for example, by a dial, slider, or text entry). The first communication device 104 then uses the template associated with the other user to modify the communication session signal until the user 110 of the first communication device 104 decides otherwise.

At step 308, the communication session signal is modified by the processor 204 based on the set of derived acoustic features and a defined desired signal characteristic. For example, the processor 204 may modify acoustic features of the communication session signal that are determined, by using the template, to be those of the user 112 of the second communication device 106. Such modification may be, for example, to modify the strength of the audio communication signal of the second communication device 106 when the strength of the audio communication signal does not meet a criterion. In some embodiments, the criterion may be an absolute value. In some embodiments, the criterion may be a value that is determined relative to the other signals in the communication session. For example, the processor 204, may use the template to eliminate the audio communication signal received from the second communication device 106 from the communication session signal and then measure an average signal level of the remaining portion of the communication session signal, and then modify the acoustic features of the original communication session signal that match the template to achieve the measured average signal level. In some embodiments, the criterion may be one that is selected by the user, using interactive controls as described above.

As described above, the present invention provides a method and system for managing a communication session involving multiple communication devices. The method involves learning a set of derived acoustic features of audio communication signals associated with the multiple communication devices. The method further involves receiving a communication session signal. Moreover, the method involves modifying the communication session signal based on the derived acoustic features. In an embodiment, the method involves modifying the communication session signal based on user preferences associated with these communication devices. Thus, the method helps in enhancing the quality of the communication session by modifying the communication session signal as per the requirements of the users of these communication devices. The user of a communication device involved in the communication session can adjust the set of derived acoustic features of an audio communication signal of another communication device present in the communication session. Thus, the method enables the user of the communication device to selectively adjust the derived acoustic features of another communication device at his/her communication device to improve the conference session quality.

In the foregoing specification, the invention and its benefits and advantages have been described with reference to specific embodiments. However, one with ordinary skill in the art would appreciate that various modifications and changes can be made without departing from the scope of the present invention, as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage or solution to occur or become more pronounced are not to be construed as critical, required or essential features or elements of any or all the claims. The invention is defined solely by the appended claims, including any amendments made during the pendency of this application, and all equivalents of those claims, as issued.

What is claimed is:

1. A method for managing a communication session associated with a plurality of communication devices, the method comprising:
   learning a set of derived acoustic features of an audio communication signal that is associated substantially only with one user of a communication device;
   receiving a communication session signal, wherein the communication session signal is an audio signal that comprises a combination of audio communication signals, wherein each audio communication signal of the audio communication signals is associated with a user of a communication device of the plurality of communication devices;
   modifying the communication session signal based on the set of derived acoustic features, when the communication session signal includes an audio communication signal associated with the user of the communication device; and
   identifying strength of the audio communication signal that is associated with the user of the communication device, prior to modifying the communication session signal.

2. The method as recited in claim 1, wherein learning comprises processing the audio communication signal that is associated substantially only with the user of the communication device to derive the acoustic features of the audio communication signal, which features are used to form a template for modifying the communication session signal.

3. The method as recited in claim 2, wherein in the step of modifying, the communication session signal is modified using the template to select acoustic features of the communication session signal that are changed so as to achieve a defined criterion.

4. The method as recited in claim 3, wherein the defined criterion is determined from at least one user preference.

5. The method as recited in claim 2, further comprising establishing that the communication session signal includes the audio communication signal that is associated with the user of the communication device by using the template.

6. The method as recited in claim 5, further comprising not modifying the communication session signal when the communication session signal does not include the audio communication signal that is associated with the user of the communication device.

7. The method as recited in claim 1 further comprising presenting a user control for at least an audio volume setting of the audio communication signal that is associated with the user of the communication device.

8. A first communication device for managing a communication session associated with a plurality of communication devices, the first communication device comprising:
   a transceiver configured to receive a communication session signal, wherein the communication session signal is an audio signal that comprises a combination of audio communication signals, wherein each audio communication signal of the audio communication signals is associated with a user of a communication device of the plurality of communication devices; and
   a processor operatively coupled with the transceiver, wherein the processor is configured to: learn a set of derived acoustic features of an audio communication signal that is associated substantially only with one user of a second communication device;
      modify the communication session signal based on the set of derived acoustic features, when the communication session signal includes an audio communication signal that is associated with the user of the second communication device; and
   identifying strength of the audio communication signal that is associated with the user of the communication device, prior to modifying the communication session signal.

9. The first communication device as recited in claim 8, wherein the processor is further configured to process the audio communication signal that is associated substantially only with the user of the second communication device to derive acoustic features of the audio communication signal, wherein the derived acoustic features are used to form a template.

10. The first communication device as recited in claim 9, wherein the communication session signal is modified by using the template to select acoustic features of the communication session signal that are changed so as to achieve a defined criterion. .

11. The first communication device as recited in claim 10 further comprises a user interface for setting an audio volume as the criterion.

12. The first communication device as recited in claim 9, wherein the processor is further configured to use the template to establish that an audio communication signal that is associated with the user of the second communication device exists in the communication session signal.

13. The first communication device as recited in claim 8, wherein the set of derived audio features comprises a signal level of the audio communication signal that is associated with the user of the second communication device.

* * * * *